Jan. 3, 1956  H. KUMMERMAN  2,729,185
WATERTIGHT CLOSING DEVICE FOR DOORS, HATCHES
OR SIMILAR ELEMENTS
Filed Oct. 23, 1951  3 Sheets-Sheet 2

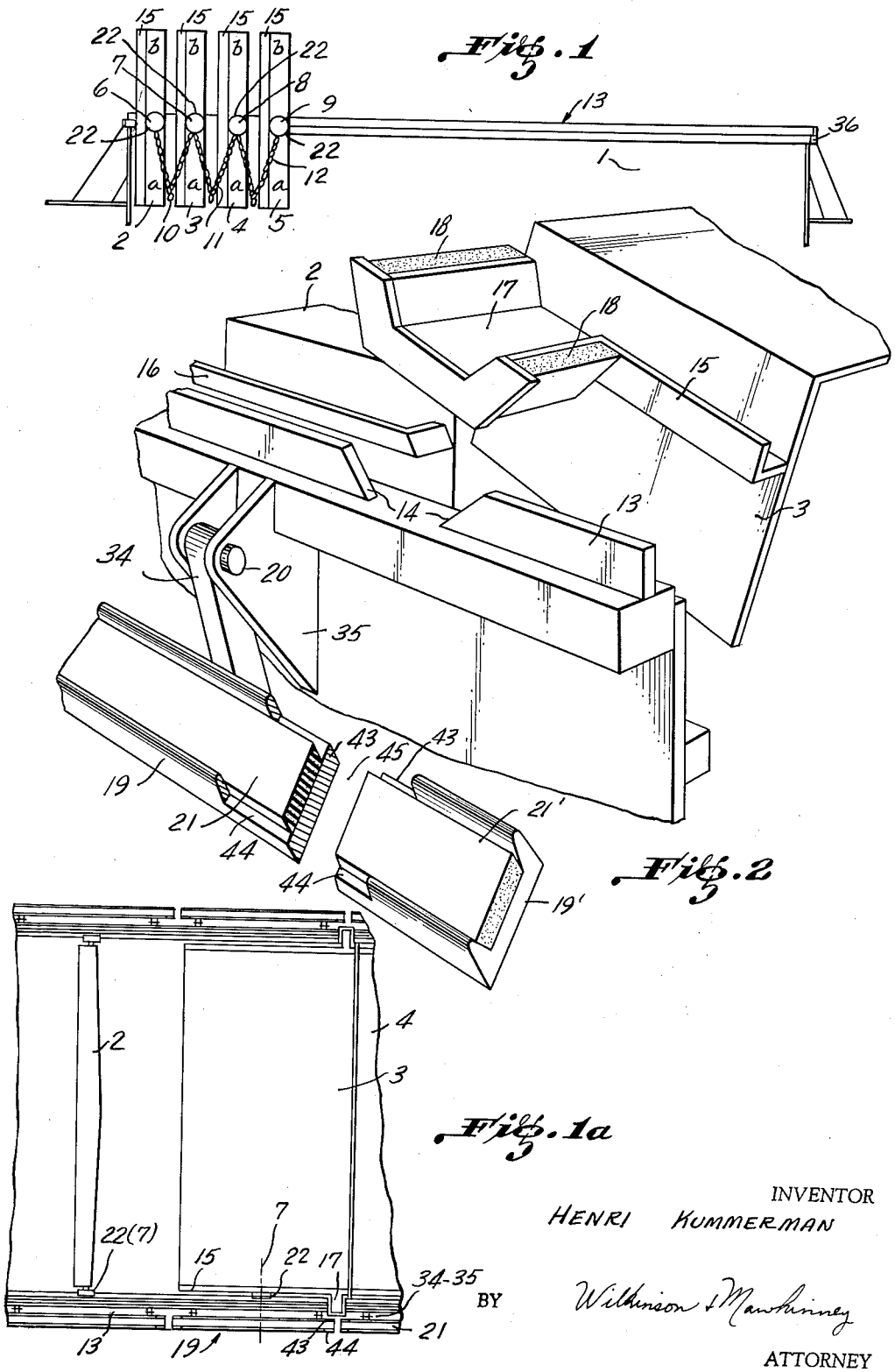

INVENTOR
HENRI KUMMERMAN

BY  Wilkinson & Mawhinney

ATTORNEY

Jan. 3, 1956  H. KUMMERMAN  2,729,185
WATERTIGHT CLOSING DEVICE FOR DOORS, HATCHES
OR SIMILAR ELEMENTS
Filed Oct. 23, 1951  3 Sheets-Sheet 3

INVENTOR
HENRI KUMMERMAN

BY Wilkinson & Mawhinney
ATTORNEY

United States Patent Office 2,729,185
Patented Jan. 3, 1956

2,729,185

WATERTIGHT CLOSING DEVICE FOR DOORS, HATCHES, OR SIMILAR ELEMENTS

Henri Kummerman, Neuilly-sur-Seine, France

Application October 23, 1951, Serial No. 252,640

Claims priority, application France November 7, 1950

6 Claims. (Cl. 114—201)

This invention relates to a watertight closing device for doors, hatchway covers or similar elements for example of the kind used on ships, etc.

Most of the known watertight closing devices of this type consist of an element such as a panel, cover or door which, in the open position, lies completely outside of the frame on which the sealing gasket is caused to bear. In this case the sealing system is simple. It consists of a more or less resilient gasket either secured to the periphery of the door or fixed to the frame and engaging the other element in the closed position.

Besides, the problem is completely different in the case of a door, a hatchway cover on a ship, etc. if these elements consist of a plurality of sections adapted for instance to roll inside the hatch-coaming and in the open position to gather at one end of the hatch-coaming where they remain.

It is conceivable that these covers roll through the medium of a pair of rollers on a corresponding pair of rails either by bearing upon, or by being hingedly connected with one another.

In the open position these covers may conceivably place themselves either above or below the hatch-coaming.

It is difficult to utilize conventional systems because if a downward-facing rubber gasket is fitted to the element positioned above the hatch-coaming and an upward-facing one to the element positioned below the hatch-coaming, both gaskets will engage a steel member welded to the hatch-coaming in the closed position whereby a two-fold inconvenience will result. On the one hand, it will be rather difficult to obtain a really watertight engagement or joint between the downward-facing and the upward-facing rubber gaskets. On the other hand, any water trapped on the upward-facing rubber gasket will be unable to escape from the hatch-coaming and will therefore remain there until the least defect in the joint will allow it to leak through to the hold, notably on opening the hatch.

All these drawbacks may be avoided by resorting to the device of the present invention which is characterised in that it comprises a joint-covering member hingedly mounted on the edge of the aperture and adapted to cover the joint between the panel, door or similar member and the aforesaid edge.

According to another feature of the invention the joint covering member is lined internally with rubber or similar material.

According to still another feature of the invention the panel, door or similar member comprises a preferably U, V or L-shaped projecting iron secured along the side edges and engaged by the aforesaid rubber lining when the joint-covering member is swung back to its sealing position.

It will readily be seen that regardless of the type of panel or door a positively watertight closing will be obtained.

Other features and advantages of the invention will appear clearly from the following description with reference to the affixed drawings forming part of the specification and illustrating diagrammatically by way of example the manner in which the invention may be applied to ship-hold hatch-covers, it being understood however that the invention may be applied to many other types of closing elements without exceeding the scope thereof.

In the drawings:

Fig. 1 shows diagrammatically a hatchway with movable closing covers;

Fig. 1a shows diagrammatically a plan view of a portion of the hatch particularly illustrating the plan view of a panel with its pivots and covering;

Fig. 2 is a perspective view at a greater scale illustrating a joint-covering member according to the invention positioned where two adjacent hold hatch-covers are joined;

Figure 3:
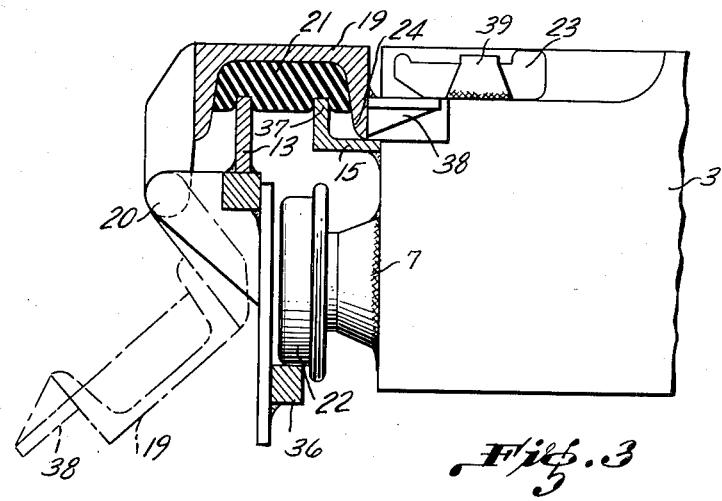
Fig. 3 is a fragmentary sectional view of a sealing device according to the invention.
Figure 4A:
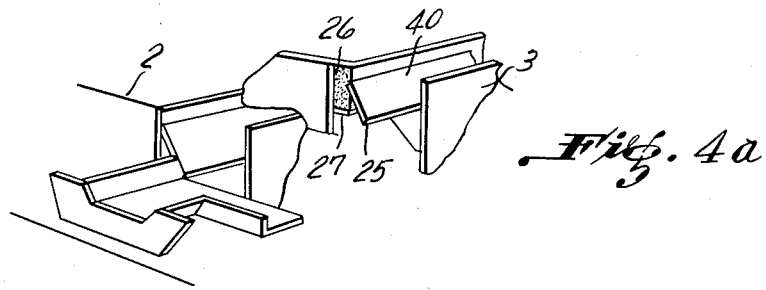
Fig. 4a is a corresponding perspective view.
Figure 4:
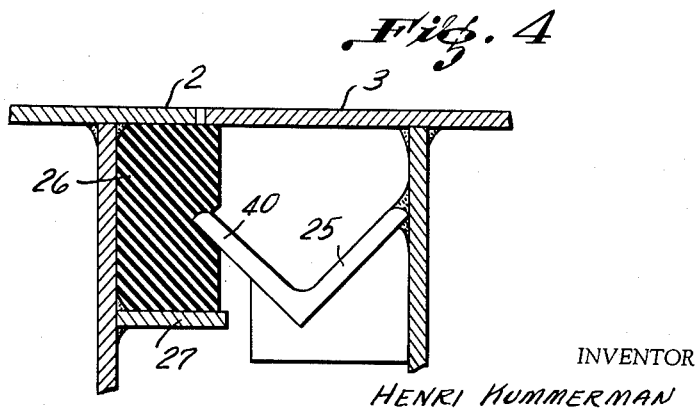
Fig. 4 is a sectional view showing a sealing joint between two adjacent hatch-covers.

The example illustrated in Figs. 1 to 4 refers to the case of a hatchway 1 provided with hatch-cover sections 2, 3, 4 and 5 adapted to be rocked about their shafts or trunnions 6, 7 8 and 9 and interconnected by chains or cables 10, 11 and 12.

These cover sections are adapted to roll along the edges of the hatchway 1 and consist of a portion *a* which in the open position as illustrated lies below the hatchway level and of a portion *b* which lies above the hatchway level.

According to this invention (see Fig. 2) the hatchway 1 is provided with an upward projecting iron 13 cut at one or more places as illustrated at 14. Two adjacent panels or covers 2, 3 are provided along their side edges with L, U or V-shaped irons 15, 16 as shown. Channel portions 17 adapted exactly to fit at 14 on the irons 15, 16 with or without the provision of a sealing material 18 are provided at corresponding breaks in the continuity of these irons 15, 16.

A joint-covering member 19 made of one or several sections is hingedly mounted on the edge of the hatchway 1 for instance by means of links 34 hingedly secured at 20 on suitable flanges 35.

It consists of a channel iron (Fig. 3) the bottom of which is lined with sealing material 21 for instance of rubber.

As shown in Figure 2, the cover may be composed of two adjacent and independent sections 19 and 19'. Independent gaps, such as 45 may be even provided at the places where the channels 17 are finally located in the cut out portions 14. Further it should also be observed that the covers 19 have cut out portions 43 and 44 corresponding to the channel 17 and permitting of covering the same.

In Fig. 3 the joint-covering member 19 is shown in thick lines in its closed position and in chain-dotted lines in its open position.

The conventional hatch cover sections are provided with suitable rollers 22 mounted on the respective axes 6, 7, 8, 9 of the panels and permitting these latter to roll on the hatchway and more precisely on element 36 secured for instance on the inner side of said hatchway. The cover is held against motion by the interaction of an appendix 38 provided thereon engaging a sliding element 23 positioned on the cover in a suitable housing 39.

Preferably, the assembly is so dimensioned as to prevent the rubber or similar lining 21 from being fully compressed by the weight of the covers. For this purpose the leg element 24 of the channel member 19 is caused to engage the horizontal portion of the U or L-shaped iron 15 of the cover 3 before the pressure applied to the sealing lining 21 by leg element 37 of the iron 15 is capable of deteriorating it.

Each cover (cover 3 for instance) is provided transversally with respect to the direction of the hatchway (this direction being perpendicular to the plan of Figure 4), and at one end with a U, L or V-shaped iron 25 of which one leg 40 engages a rubber or similar lining 26 fixed to the adjacent cover (2 for instance) and kept in position by a flat iron element 27 welded or otherwise fixed to this cover. Thus, an efficient seal is obtained between adjacent hatch-covers and between end covers and the small sides of the hatchway, a substantially similar arrangement being provided for this purpose along these sides.

Figure 5:
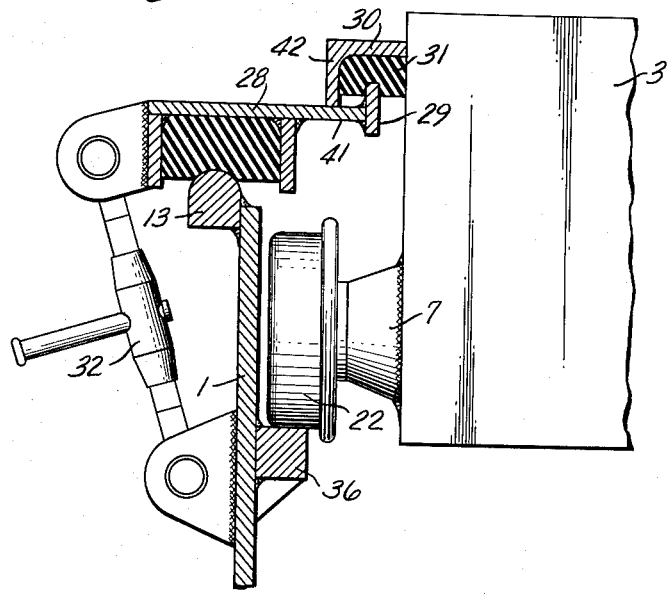
Fig. 5 is a view similar of Fig. 3 but showing a modified embodiment of the sealing device.

In the modified embodiment of Fig. 5 the joint-covering member consists of an inverted channel element 28, the bottom of which is formed with an inward extension 41 having formed thereon or welded thereto a projection 29 as shown. The hatch-cover (such as 3 for instance) is provided in turn with an inverted L-shaped iron 30 containing a rubber or similar lining 31. The latter is engaged in the closed position by the projection 29 as shown. The leg 42 of iron 30 rests on projection 41 limiting thereby the compression or deformation of the lining 31 by projection 29. A jack or similar device 32 is provided for clamping the joint.

Figure 6:
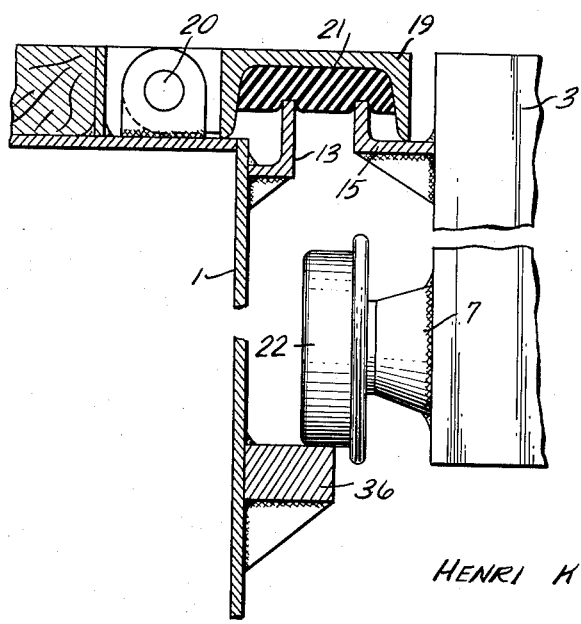
Fig. 6 is another modified embodiment for a flush-deck arrangement.

Fig. 6 illustrates the case of a joint-covering device similar to that shown in Fig. 3 but designed for a flush-deck arrangement.

Of course, the invention is not restricted to the embodiments described and illustrated herein as many applications may be devised from the basic principle of the joint-covering device incorporated therein.

What I claim is:

1. A device for closing a hatch opening on a ship comprising at least one panel having opposite lateral sides located in a hatch opening for closing said hatch opening, a pivot shaft extending outwardly on each of said opposite lateral sides of the panel which are parallel to the sides of the hatch opening pivotally mounting said panel in said hatch opening, for swinging to a substantially horizontal position substantially vertically projecting means on said lateral edges of said opening, and means extending laterally and projecting generally vertically from the sides of the panel carrying said pivot shafts, both said projecting means being spaced and extending substantially parallel when the panel is in substantially horizontal position, at least one cover element hingedly mounted on the side of said hatch opening and on an axis generally parallel to the lateral side of said hatch opening, and a resilient packing contained in said cover element, said cover element being adapted to be tilted in a substantially horizontal position over said projecting means or away therefrom to close or open a tight joint therebetween.

2. A device, according to claim 1, wherein the cover element consists of a U-shaped iron inverted in the closed position, said cover element being hingedly secured by one wing on the side of said opening, whereas the said projecting means on the panel consists of an iron having a free edge and adapted when said cover element is tilted down to engage with said free edge said resilient packing.

3. A device, according to claim 1, wherein channel means are provided transversally through both said projecting means, said channel means draining any water which might leak in the joint or accumulate between the panel and the projecting means pertaining thereto.

4. A device, according to claim 3 wherein said channel means are located in cut-out portions provided in the projecting means carried by the hatch opening and of channel shaped elements with resilient linings on their lateral outer faces provided transversally of the panel and adapted to engage the said cut-out portions, said cover element having a cut-out conforming to said channel means.

5. A device according to claim 1, wherein said cover element consists of a channel shaped iron with two legs locating the said resilient packing therebetween, said cover element having, in the closed position, one leg contacting the bottom part of the projecting means provided on the panel thereby limting the compression of said packing.

6. A device according to claim 1 wherein at least one lateral projection is provided on said cover elements and locking means provided on the adjacent panel adapted to engage said projection and avoid an undue opening of the joint formed by said cover element.

References Cited in the file of this patent

UNITED STATES PATENTS

| 1,735,329 | MacGregor | Nov. 12, 1929 |
| 1,821,595 | Von Tell | Sept. 1, 1931 |
| 2,093,362 | Nelson | Sept. 14, 1937 |
| 2,121,386 | Henrickson | June 21, 1938 |
| 2,156,635 | Mascuch et al. | May 2, 1939 |
| 2,256,087 | Hay | Sept. 16, 1941 |
| 2,590,985 | MacGregor | Apr. 1, 1952 |
| 2,633,613 | MacGregor | Apr. 7, 1953 |

FOREIGN PATENTS

| 466,019 | Great Britain | May 14, 1937 |
| 611,848 | Great Britain | Nov. 4, 1948 |